F. B. NIESZ.
DISK HARROW SCRAPER.
APPLICATION FILED NOV. 30, 1908.
935,680.
Patented Oct. 5, 1909.
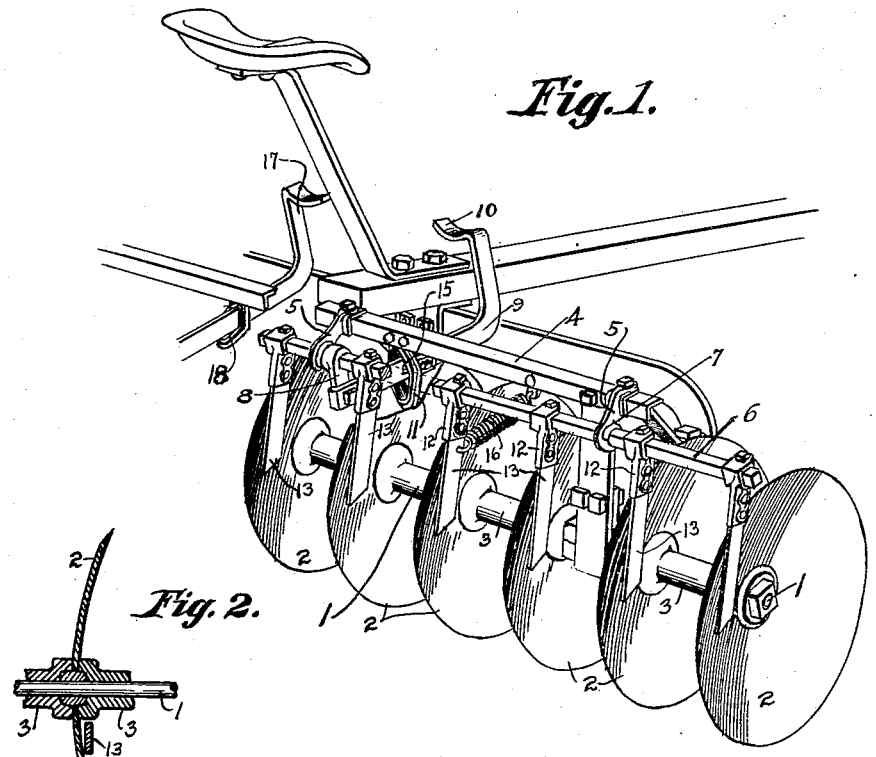
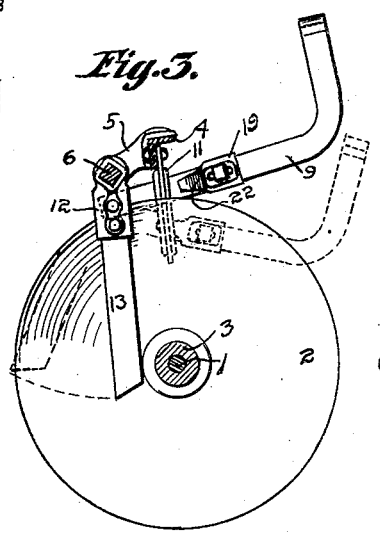
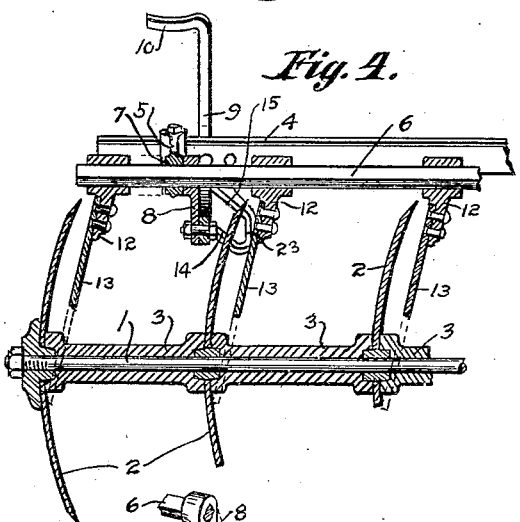
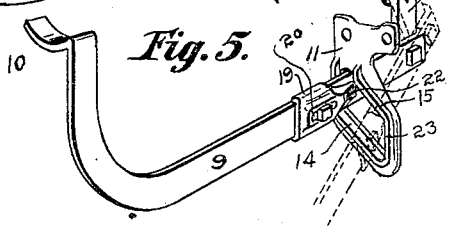
WITNESSES
INVENTOR
Frank B. Niesz
ATTORNEYS

UNITED STATES PATENT OFFICE.

FRANK B. NIESZ, OF CANTON, OHIO, ASSIGNOR TO THE BUCHER & GIBBS PLOW COMPANY, OF CANTON, OHIO, A CORPORATION OF OHIO.

DISK-HARROW SCRAPER.

935,680.

Specification of Letters Patent. Patented Oct. 5, 1909.

Application filed November 30, 1908. Serial No. 465,395.

*To all whom it may concern:*

Be it known that I, FRANK B. NIESZ, a citizen of the United States, residing at Canton, in the county of Stark and State of Ohio, have invented certain new and useful Improvements in Disk-Harrow Scrapers; and I do hereby declare that the following is a full, clear, and exact description of the same, reference being had to the accompanying drawing, making a part of this specification, and to the numerals of reference marked thereon, in which—

Figure 1 is a perspective view showing a portion of a disk harrow and illustrating the scrapers in proper relative position with reference to the disks, also showing the rock bar and the operating lever, and also showing a portion of an operating lever designed to actuate the scraper designed to scrape the disks located upon the rear axle or shaft. Fig. 2 is a sectional view of one of the harrow disks and a transverse section of a scraper blade. Fig. 3 is a side elevation of one of the harrow disks illustrating the normal position of the scraper blade. Fig. 4 is a longitudinal section showing a number of disk spacing collars and a number of disks properly located upon the shaft and illustrating the scrapers properly connected to the rock shaft. Fig. 5 is a view showing the proper relative position of the scraper blade actuating lever and its guide bracket, showing a portion of the rock shaft.

The present invention has relation to scraper and disk harrows and it consists in the novel arrangement hereinafter described and particularly pointed out in the claims.

Similar numerals of reference indicate corresponding parts in all the figures of the drawing.

In the accompanying drawing, 1 represents the shaft or axle upon which the various disks 2 are mounted and held in proper spaced relationship with reference to each other by means of the usual spacing collars 3. These parts however within themselves form no specific part of the present invention. To the bar 4 which constitutes a part of the harrow frame proper are attached the rearward extending bracket arms 5, which bracket arms are for the purpose of carrying the rock bar 6, which rock bar is preferably rectangular or square throughout its entire length but the apertures 7 formed in the bracket arms 5 are formed round and of sufficient size to provide suitable bearings for the rocking movement of the rock arms 5. Upon the rock bar 5 is secured the short bar or what might be termed link 8. To the lower end of which is rigidly attached the lever 9, which lever 9 extends forward and upward as illustrated in Figs. 1 and 3 and is so formed for the purpose of bringing the foot contact portion 10 in proper position to be actuated by the foot of the driver. To the bar 4 or its equivalent is securely attached the bracket 11 through which bracket the lever 9 passes, which bracket is for the purpose hereinafter described. To the rock bar 6 are securely attached the scraper connecting heads 12, to which heads are attached the scraper blades 13, which scraper blades are formed of such a length that they will extend down and when in their normal positions be substantially in a horizontal plane with the shaft or axle 1. It will be understood that when the scraper blades 13 are oscillated as hereinafter described there must be some lateral movement owing to the fact that the surfaces of the disks 2 upon which the scraping blades 13 come in contact are concaved or dished as illustrated in the drawing, and in order to provide for this lateral or sidewise movement of the scraper blades the bracket 11 through which the lever 9 passes is provided with the inclined wall 14 upon which inclined wall the lever rides during its downward movement and imparts an endwise movement to the rock bar 6 and carries the scraper blades with said endwise movement.

It will be understood that the scrapers 13 should be so adjusted that they will come in close contact with the concaved surfaces of the disks 2 as they are swung outward or toward the peripheries of the disks 2. It will also be understood that when the scrapers 13 are brought into their normal position they must be carried or moved sidewise or laterally in the opposite direction from the sidewise or lateral movement when they are swung outward and in order to provide for this return lateral or sidewise movement the bracket 11 is provided with the inclined wall 15 upon which wall the lever 9 rides during its upward or return movement.

It will be understood that the normal position of the lever 9 should be its elevated position, and in order to automatically elevate the lever 9 and automatically swing the scrapers toward the shaft or axle 1 the spring 16 is provided one end of said spring being attached to one of the scrapers 13 and its opposite end connected to form part of the frame. In the drawing I have illustrated but one spring and when one spring is employed it should be of sufficient strength to automatically actuate the lever 9 together with the different parts movable with said lever, but I do not desire to be confined to a single spring as it will be readily seen that any desired number of springs may be employed without in any manner departing from the nature of the invention.

In some instances it is desirable to have two shafts or axles and two series or sets of disks one series located behind the other and hence it is necessary to provide a second lever such as 17 and a second bracket 18, but these parts are duplicates of the parts described and are operated in the same manner. It is well understood that disks of different diameters are employed and hence it is desirable to provide means whereby the scrapers 13 will not be thrown rearward beyond the peripheries of the disks but on the other hand it is necessary that the scrapers be thrown rearward a sufficient distance to scrape the entire surface of the disks but should not be thrown beyond the peripheries of any disk. In order to provide means for stopping the backward movement of the scrapers so that they will not move beyond the peripheries of the disks, the lever 9 is provided with the adjustable stop block 19, which stop block is provided with the elongated slot 20 through which slot the clamping bolt is passed.

It will be understood that by adjusting the stop block 19 to or from the bracket 11 the downward movement of the lever 9 will be limited by reason of the stop block 19 coming in contact with the front or forward face 23 of the bracket 11. The adjustment of the stop block 19 should be such that the downward movement of the lever 9 will be stopped at a point so as to stop the rearward swinging movement of the scraper blades 13 when they have passed the peripheries of the disks 2. The stop block 19 is provided with the beveled end 22 which beveled end is designed for contact with the straight wall 23 of the bracket and the stop brought to such an adjustment that a thicker or thinner portion will be adapted for contact with the straight wall thereby limiting the downward movement of the lever 9. It will be understood that when the stop block 19 is adjusted so that a small portion of the beveled end 22 enters the aperture, the downward movement will be greater than when a thicker portion of the beveled end enters between the walls.

It is well understood that in order to give practically the same degree of frictional contact as between the scraper blades 13 and the surfaces of the disks 2, the rock bar 6 must move endwise during the time said bar is rocked and the scraper blades oscillated, owing to the fact that the disks are concaved. It will be noted that if there was no end movement of the rock bar 6 during the time it was rocked, the scraper blades would swing in a true vertical plane if left unobstructed, but owing to the convexity of the disks 2 the scraper blades must follow the curved surface and hence a springing action must take place which springing action has a tendency to increase the friction as the scraper blades move outward and by this increased friction the surfaces of the disks are more or less roughened, which roughened surface has a tendency to cause the soil to adhere to the surfaces of the disks. By providing an end movement to the rock bar 6 the friction of the scraper blades is substantially uniform upon the surfaces of the disks during the entire scraping action of the scraper blades.

Having fully described my invention what I claim as new and desire to secure by Letters Patent, is—

1. In a disk harrow scraper, the combination of a disk harrow, a rock shaft carried thereby, a bracket and a lever located through said bracket, said bracket provided with inclined walls, the lever adapted to actuate the rock shaft, said lever provided with an adjustable stop and scraper blades carried by the rock shaft, substantially as and for the purpose specified.

2. In a disk harrow scraper, the combination of a disk harrow, a rock shaft carried thereby, a bracket and a lever located through said bracket, said bracket provided with inclined walls, the lever adapted to actuate the rock shaft, said lever provided with an adjustable stop having a beveled end, and scraper blades carried by the rock shaft, substantially as and for the purpose specified.

In testimony that I claim the above, I have hereunto subscribed my name in the presence of two witnesses.

FRANK B. NIESZ.

Witnesses:
F. W. BOND,
SYLVIA BORON.